UNITED STATES PATENT OFFICE.

WILHELM HAARMANN, OF BERLIN, PRUSSIA.

IMPROVEMENT IN THE MANUFACTURE OF ARTIFICIAL VANILLIN.

Specification forming part of Letters Patent No. 151,119, dated May 19, 1874; application filed May 6, 1874.

*To all whom it may concern:*

Be it known that I, WILHELM HAARMANN, of Berlin, in the Kingdom of Prussia and Empire of Germany, have invented a new and useful Improvement in the Manufacture of Vanillin; and I do hereby declare the following to be a full, clear, and exact description thereof, which will enable those skilled in the art to make and use the same.

This invention consists in the production of vanillin (the aromatic substance of vanilla) from coniferin, or from the cambium of coniferous woods, or from an extract of all those parts of coniferous woods which contain coniferin.

In preparing vanillin from coniferin I proceed as follows: Ten parts (by weight) of coniferin are immersed in a mixture of ten parts of chromate of potassa, with fifteen parts of strong sulphuric acid and eighty parts of water, and the whole is heated for about three hours. From the liquid thus obtained the vanillin can be separated by shaking it for some time with sulphuric ether, after it has been cooled, then removing the ether and purifying the dark colored residuum by repeated crystallization. The vanillin can also be obtained by securing to the vessel containing the mixture of coniferin, chromate of potassa, sulphuric acid and water, a distilling apparatus soon after said mixture has been heated for three hours; then about four-fifths of the liquid are evaporated, and the residuum is treated with ether, and the product obtained is purified by repeated crystallization, as above described.

In producing vanillin from the cambium, or from extracts of coniferous woods, I proceed as follows: I heat the liquid in a water-bath, so as to evaporate a large portion of the same, and then I dry the residue at 212° Fahrenheit, whereby the quantity of coniferin and sugar in the solution is ascertained. The residue obtained by this process is then treated with chromate of potassa, concentrated sulphuric acid, and water, in about the following proportions: Residue of the solution, ten parts; chromate of potassa, fifteen parts; concentrated sulphuric acid, twenty parts; and water, the quantity of which depends upon the strength or degree of concentration of the solution.

My process is based on that property of coniferin which decomposes under the influence of ferments into sugar and a crystallized substance, which, when in contact with damp air, changes slowly and incompletely into vanillin.

The artificial vanillin obtained by my process is, in every respect, completely identical with the natural vanillin. Both show the same form of crystallization, the same degree of fusion, the same smell, taste, and aspect. Both are equal in sublimation, both show the same properties with nitrate of silver, and both have the same chemical composition.

What I claim as new, and desire to secure by Letters Patent, is—

1. Artificial vanillin, produced by treating coniferin or equivalent substances substantially in the manner described.

2. The within-described process for producing artificial vanillin, by treating coniferin or equivalent substances substantially in the manner set forth.

DR. WILHELM HAARMANN.

Witnesses:
  H. BREISMANN,
  GEORG PRILLWITZ.